US006539350B1

(12) United States Patent
Walker

(10) Patent No.: US 6,539,350 B1
(45) Date of Patent: Mar. 25, 2003

(54) METHOD AND CIRCUIT ARRANGEMENT FOR SPEECH LEVEL MEASUREMENT IN A SPEECH SIGNAL PROCESSING SYSTEM

(75) Inventor: Michael Walker, Baltmannsweiler (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/442,392

(22) Filed: Nov. 18, 1999

(30) Foreign Application Priority Data

Nov. 25, 1998 (DE) ........................................ 198 54 341

(51) Int. Cl.[7] ......................... G10L 15/20; G10L 15/08; G10L 15/06; G10L 15/04

(52) U.S. Cl. ....................... 704/233; 704/236; 704/243; 704/253

(58) Field of Search ................................ 704/275, 251, 704/257, 270.1, 233, 253, 243

(56) References Cited

U.S. PATENT DOCUMENTS

| | | | | | |
|---|---|---|---|---|---|
| 4,032,710 A | * | 6/1977 | Martin et al. | 704/253 |
| 4,625,083 A | * | 11/1986 | Poikela | 704/233 |
| 4,625,327 A | * | 11/1986 | Sluijter et al. | 704/214 |
| 4,637,046 A | * | 1/1987 | Sluijter et al. | 704/214 |
| 4,696,039 A | | 9/1987 | Doddington | |
| 5,305,422 A | * | 4/1994 | Junqua | 704/253 |

FOREIGN PATENT DOCUMENTS

| | | |
|---|---|---|
| DE | 32 36 834 C2 | 10/1983 |
| DE | 32 30 391 C2 | 2/1984 |
| DE | 689 03 872 T2 | 6/1993 |
| DE | 0 565 224 A2 | 10/1994 |
| DE | 691 05 154 T2 | 3/1995 |
| JP | 07 326 981 A | 12/1995 |

OTHER PUBLICATIONS

Gansler et al ("Non–Intrusive Measurements of the Telephone Channel", IEEE Transactions on Communications, Jan. 1999).*

Bertocco et al ("In–Service Non–Intrusive Measurement of Noise and Active Speech Level in Telephone–Type Networks", IEEE Transactions on Instrumentation and Measurement, Aug. 1998).*

Bentelli et al ("A Multi–channel Speech/Silence Detector based on Time Delay Estimation and Fuzzy Classification", IEEE International Conference on Acoustics, Speech, and Signal Processing, Mar. 1999).*

McKinley et al ("Model Based Speech Pause Detection", IEEE International Conference on Acoustics, Speech, and Signal Processing, Apr. 1997).*

Ramsden ("In–Service, Non–Intrusive Measurement on Speech Signals", Global Telecommunications Conference on Personal Communications Services, May 1991).*

Hentschke: "Grundzuge der Digitaltachnik (Fundamentals of Digital Technology)", Stuttgart: Teubner 1988, pp. 52–55.

Eppinger, Herter: "Sprachverarbeitung (Speech Processing)", Munich, Vienna: Hanser 1983, pp. 73–77.

Bauer, B. B. et al.: "The Measurement of Loudness Level" Journal of the Acoustical Society of America, US, American Institute of Physics. New York, BD. 50, Nr. 2, Part 01, Aug. 1971, pp. 405–414 XP000795762 ISSN: 0001–4966.

* cited by examiner

*Primary Examiner*—Richemond Dorvil
*Assistant Examiner*—Daniel A. Nolan
(74) *Attorney, Agent, or Firm*—Sughrue Mion, PLLC

(57) ABSTRACT

Speech level measurement is particularly significant for successful echo compensation in telecommunications systems, for noise suppression in a noisy environment, for example in military vehicles, or in speech recognition and in speech coding and decoding systems. A method is indicated which permits speech levels measurement only if features of speech are recognized and interferences and speech pauses are filtered out for the measurement. To this end, speech and pause detectors and a mean value generator are utilized, the time behavior of which is largely adapted to the perception capability of the human ear. Briefly spoken vowels thus are well detected, while nasal sounds or consonants are suppressed in the case of falling levels. A speech level measuring device is indicated which provides very accurate results in a short adaptation period.

11 Claims, 3 Drawing Sheets

METHOD AND CIRCUIT ARRANGEMENT FOR SPEECH LEVEL MEASUREMENT IN A SPEECH SIGNAL PROCESSING SYSTEM

BACKGROUND OF THE INVENTION

In speech signal processing systems, the current speech level is used, by way of example, for the scaling of signals, for threshold decision, for detection of speech pauses, and/or for automatic adjustment of amplification. Speech level measurement has special significance for successful echo compensation in telecommunications systems, for noise suppression, or in speech recognition in speech coding and speech decoding systems.

The formation of SL (speech level) mean value from sampled values x(k) of a speech signal x(t) within a time interval according to equation G1 is generally known.

$$SL = \sum_{0}^{N} \frac{|x(k)|}{N} \quad \text{(G1)}$$

In the case of speech pauses, the mean value SL assumes the value of the quiescent sound in a period of time determined by the number N of sampled values. At the beginning of the speech activity, a mean value generator requires a period of time determined by the number N to determine the speech level. Determination of a mean value in a time interval of 125 ms requires a data memory of 1000 data words at a sampling rate of 8 kHz. Aside from the considerable computing and memory requirements, in the simple formation of a mean value there is a danger that in the case of a brief averaging period, errors will occur in determining the speech level as a result of interference factors. In the case of long averaging periods, first the information concerning the value of the speech level is available very late, and secondly measuring errors with respect to the speech level occur in the event of changes in speech level.

Also known is the use of recursive filters for the formation of a mean value; compare Hentschke: *Grundzüge der Digitaltechnik* (Fundamentals of Digital Technology), Stuttgart: Teubner 1988, pages 52–54. The computing and memory requirements for these digital filters are relatively small; however, all signal values are determined so that distinguishing between speech and interference noise is not possible.

From the field of speech processing, the method of linear prediction (linear predictive coding, LPC) is known with which distinguishing features of speech and interference noise can fundamentally also be determined. LPC analysis is very precise and can be performed very quickly and is a powerful method with which, among other things, the base frequency, spectrum, and formats of a speech signal can be determined; compare Eppinger, Herter: *Sprachverarbeitung* (Speech Processing), Munich, Vienna: Hanser 1983, pages 73–77. Such a costly method, however, is not suitable for mass products such as telecommunications terminal devices for commercial reasons.

SUMMARY OF THE INVENTION

The invention solves the object of suggesting a cost-effective, practicable method for speech level measurement and a circuit arrangement for implementing the method having the following properties:

From a time signal the current speech level is to be determined as quickly and precisely as possible, The adaptation period of the speech level measurement circuit should be short in order to avoid audible errors such as fluctuations in loudness, The measured speech level should be independent of level fluctuations of the speech caused, for example, by nasal sounds and open vowels, The measured speech level should be independent of short-time disturbance influences such as, for example, whispering, coughing, clapping, slamming of doors, although these particular interferences have a high energy content, In speech pauses, the measured value of the speech level should be maintained in order to suppress the breathing of loudness known from automatic gain control, AGC.

This object is achieved through the method described in the first patent claim and through the circuit arrangement described in the seventh patent claim. The essence of the invention consists of a measured speech level value being admitted for further processing in a speech signal processing system only if characteristic features of speech are recognized and interference signals and speech pauses being filtered out for the measurement.

BRIEF DESCRIPTION OF THE DRAWINGS

The invention is described below using one exemplary embodiment. The associated drawings are as follows.

DETAILED DESCRIPTION OF THE INVENTION

Figure 1:
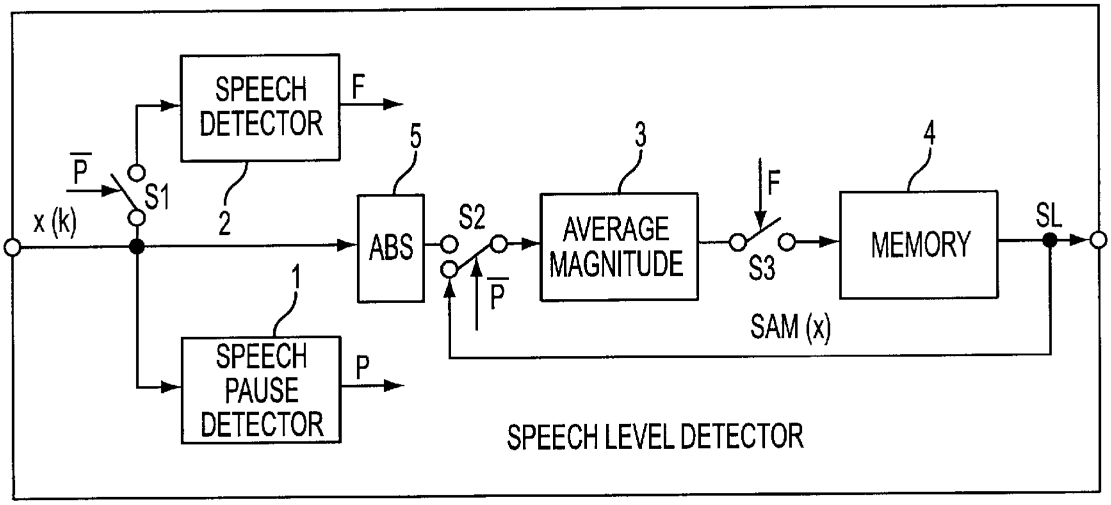
FIG. 1 shows a block diagram of the circuit arrangement according to the invention.

According to FIG. 1, the circuit arrangement is made up essentially of a speech pause detector 1, a speech detector 2, a mean value generator 3, a memory 4, and a circuit 5 for forming an absolute value. The sampling function x(k) of a speech signal is situated at the circuit input; at the circuit output, the value of a speech level SL is outputted. If a speech pause, output signal P of speech pause detector 1, is recognized and if no speech, output signal F of speech detector 2, is recognized, a first switch S1, a second switch S2, and a third switch S3 are in the depicted position. If a speech signal is present in the form of sampling function x(k), i.e., a speech pause P is not recognized, the speech detector 2 is activated via closed first switch S1 and the mean value generation is initiated via circuit 5 and closed second switch 2 with mean value generator 3. If a speech signal was recognized, the third switch S3 is closed via output signal F of speech detector 2 and output signal SAM(x) of mean value generator 3 is accepted via third switch S3 into memory 4. During the speech pauses, the last measured speech level SL is transferred from memory 4 to mean value generator 3 via second switch S2. Using the mean value generator 3, a short-time mean value SAM(x) (short average magnitude) is formed which is largely adapted to the time behavior of the short-time mean value generation SAM(x) of the subjective perception function of the human ear. A dynamic jump from soft to loud tones is additionally computed with a small time constant $\tau s$, for example, smaller than 6.5 ms. A dynamic jump from loud to soft tones is computed in accordance with the post-masking effect of the human ear with a large time constant τl, for example 65 ms to 300 ms. Briefly spoken vowels are well detected in this manner. In the case of falling levels, nasal sounds or consonants with a lower level in comparison with vowels are largely suppressed in speech level measurement by the large time constant τl . Through the differing time constants τs, τl for increasing and falling signal waveform, a fast adaptation of the short-time mean value SAM(x) to the current peak value of the short-time level of the speech signal is achieved. This peak value of the short-time level of the speech signal thus determines the relative speech level independent of speech content.

Figure 2:
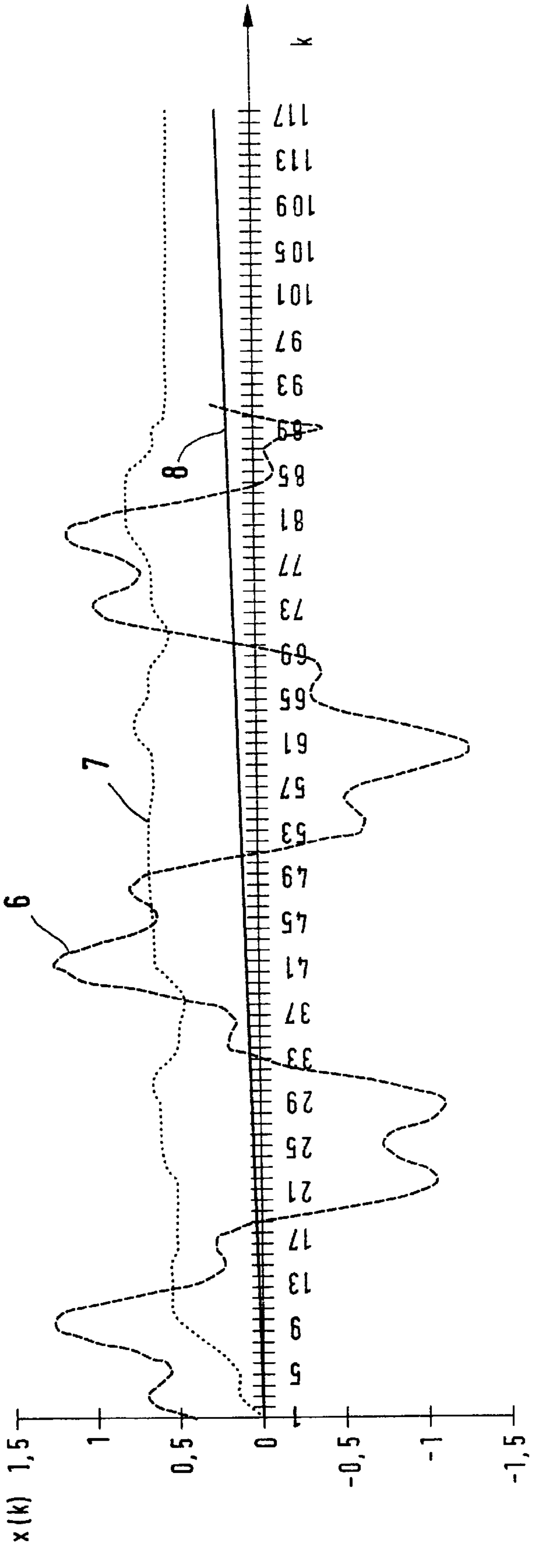
FIG. 2 shows a representation of the time functions of the sampling values of speech signal, of a short-time mean value, and of a lowpass filtered speech signal

FIG. 2 shows the time behavior of the sampling values for three functions. The input function x(k) of the speech level measurement circuit is depicted according to FIG. 1 as function curve 6 of a speech sample. Function curve 7 shows the course of the short-time mean value SAM (x(k)), SAM (x) for short, taking into consideration the mode of operation of the different time constants τs, τl as described above. For comparison, a third function curve 8 which represents the effect of a simple lowpass. From this it can be seen that a lowpass is not suited for rapid, precise determination of the current speech level.

Figure 3:
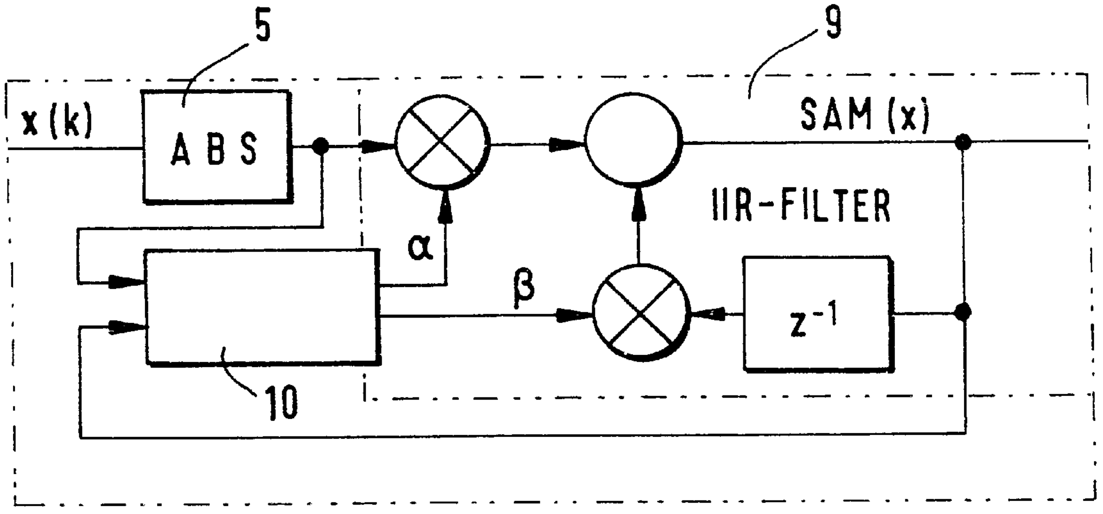
FIG. 3 shows a block diagram of an arrangement for determining the short-time mean value.

Depicted in FIG. 3 are the details of mean value generator 3 which contains a recursive filter, an IIR filter 9 (infinite impulse response filter) which is known as such, and a circuit arrangement 10 for changing the time constants τs, τl. Circuit 5 for the formation of the absolute value corresponds to the circuit depicted in FIG. 1. In order to achieve the variation of the short-time mean value SAM (x) described, changing of the time constants τs, τl according to the following equation G2 is necessary:

$$\alpha,\beta=\begin{cases}\tau s, & \text{if} \quad x(k)>SAM(x)\\ \tau l & \text{otherwise}\end{cases} \qquad \text{(G2)}$$

This means that if the sampling value x(k) of speech signal x(t) is greater than short-time mean value SAM (x), for example in FIG. 2 function curve 6, sampling times being 0 through 12, the value of the short-time constants τs are used for computation of the short-time mean value SAM (x) for time constants α, β.

The speech pause detector 1 in FIG. 1 is realized through the use of a method with which the time behavior of sampling function x(k) of the speech signal is evaluated. Short-time mean value SAM (x) of sampling function x(k) is compared with a long-time minimum value determined in a time interval from a number of short-time mean values SAM (x).

$$P=SAM(x)<\min_{0}^{tlam}[SAM(x)] \qquad \text{(G3)}$$

The minimum value of the short-time mean value SAM (x) is sought in a time interval of t=0 . . . τlam, for example τlam=3s to 7s. If the current short-time mean value SAM (x) is less than this minimum value, the input signal x(k) at the speech level circuit is evaluated as pause P. Speech signals would always be greater than the determined minimum value.

For reliable determination of the current speech level, not only is it necessary to distinguish between speech and speech pause but also to distinguish between speech and interference. The speech detector 2 depicted in FIG. 1 serves this purpose, the output signal F of which serves as the deciding criterion for the accepting short-time mean value SAM (x) into memory 4. Distinguishing features for speech and interference are, for example, the time behavior, the periodicity, or the representation of LPC coefficients by an LPC filter. For the present objective, the evaluation of time behavior is advantageous. To accomplish this, use is made of the fact that interferences act on a short-time basis, generally shorter than 200 ms, while a speaker is active for a longer period of time, at least 1 s, in order to deliver information, and the speech function does not have high momentary values on a short-time basis. The inequality G4 describes the condition which must be fulfilled for the detection of the input signal x(k) as speech.

$$F=[SAM(x)\ \ldots\ SAM(x-i)]>\min_{0}^{tlam}[SAM(x)] \qquad \text{(G4)}$$

$$\text{for } i>\tau(s)\cdot Fa$$

where $i$ = number of sample values $k$ $\tau(s)$ = speech time $Fa$ = sampling frequency

[SAM (x) . . . SAM (x–i)] means that a stimulus must be present for a certain minimum period so than even noise is not detected as stimulus. The right side of inequality G4 was explained in the description of inequality G3. Time monitoring for speech time τ(s) is performed with a not-depicted meter which is started and reset by speech pause detector 1. In the event the defined speech time τ(s) is exceeded, the short-time mean value SAM (x) measured previously by mean value generator 3 is accepted into memory 4. It is practically advantageous to define speech time τ(s) as a duration of 300 ms.

It is also possible to vary the time constants τs, τl of mean value generator 3 in order to obtain speech level SL adapted for the particular application. The formation of a short-time mean value SAM(x) described in the exemplary embodiment is advantageously employed in a tank. In the case of unclear speakers it is more advantageous to form a mean value (medium average magnitude) MAM(x) with the small time constant τs being increased and the large time constant τl of mean value generator 3 being reduced. With modest computing and memory requirements a cost-effective and reliable measurement of speech level is realized as described.

What is claimed is:

1. Method for measuring speech level in a speech signal processing system comprising:

feeding a speech signal to a speech pause detector and to a speech detector, detecting a pause by the speech pause detector and detecting speech by the speech detector, and determining a mean value of the speech signal with a mean value generator, the transfer function of which is adapted to the transfer function of a human ear, storing the measurement mean value in a memory for further processing a measured speech level, if speech is detected.

2. Method according to claim 1, wherein:

in said detecting step, a pause in the speech signal is detected by the pause detector if a short-time mean value of the speech signal is smaller than a long-time mean value of the speech signal determined in a defined interval of time.

3. Method according to claim 1, wherein:

in said detecting step, speech in the speech signal is detected by the speech detector when for a minimum period of time the stimulus of the speech detector exceeds a long-time mean value of the speech signal determined in a defined interval of time.

4. Method according to claim 1, wherein:

the mean value generator generates a short-time mean value of the speech signal such that the mean value generation takes place over different time constants with rising characteristic of the speech signal and with falling characteristic of the speech signal.

5. Method according to claim 4, wherein:

a small time constant is used for forming the mean value of the rising characteristic of the speech signal, wherein the rising characteristic of the speech signal contains dynamic jump from soft to loud tones.

6. Method according to claim 5, wherein:

the small time constant is less than 6.5 ms.

7. Method according to claim 4, wherein:

a large time constant is used for the mean value formation of the falling characteristic of the speech signal, wherein a post-masking effect of the human ear is simulated.

8. Method according to claim 7, wherein:

the large time constant is between 65 ms and 300 ms.

9. Circuit arrangement for speech level measurement in a speech signal processing system wherein:

an input of the circuit arrangement is connected to both a speech pause detector and a speech detector, and an output of a mean value generator is connected to a memory.

10. Circuit arrangement according to claim 7, wherein:

the input of the speech detector is switched via a first switch, and the input of the mean value generator is switched via a second switch, and the first switch and the second switch are controlled by the output signal of the speech pause detector.

11. A circuit arrangement according to claim 9, wherein:

the output of the mean value generator is connected to the memory via a third switch which is controlled by the output signal of the speech detector.

* * * * *